United States Patent
Galloway et al.

(10) Patent No.: US 10,091,203 B2
(45) Date of Patent: *Oct. 2, 2018

(54) SPECIALIZED NETWORK FILESERVER

(71) Applicant: Apple Inc., Cupertino, CA (US)

(72) Inventors: Curtis C. Galloway, Santa Cruz, CA (US); John Andrew Wright, San Francisco, CA (US); Adi Masputra, San Jose, CA (US); Kwasi G Mireku, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/722,134

(22) Filed: May 26, 2015

(65) Prior Publication Data

US 2015/0341366 A1 Nov. 26, 2015

Related U.S. Application Data

(63) Continuation of application No. 12/895,481, filed on Sep. 30, 2010, now Pat. No. 9,052,919.
(Continued)

(51) Int. Cl.
*G06F 17/30* (2006.01)
*H04L 29/06* (2006.01)
(Continued)

(52) U.S. Cl.
CPC .......... *H04L 63/101* (2013.01); *G06F 9/4411* (2013.01); *G06F 13/385* (2013.01);
(Continued)

(58) Field of Classification Search
CPC ............ G06F 9/4411; G06F 17/30067; G06F 21/6218; G06F 21/6296; G06F 17/30165; G06F 21/629; H04L 63/101
See application file for complete search history.

(56) References Cited

U.S. PATENT DOCUMENTS 6,246,683 B1 6/2001 Connery et al.
6,367,022 B1 4/2002 Gillespie et al.
(Continued)

FOREIGN PATENT DOCUMENTS

CN 101194491 A 6/2008
EP 2015213 A1 12/2015
(Continued)

OTHER PUBLICATIONS

European Patent Application No. 11702529.6—Communication pursuant to Article 94(3) EPC dated Mar. 4, 2016.
(Continued)

*Primary Examiner* — Kannan Shanmugasundaram
(74) *Attorney, Agent, or Firm* — Dickinson Wright RLLP

(57) ABSTRACT

A method and apparatus of a portable storage device that provides a specialized network fileserver is described. In an exemplary method, the portable storage device retrieves a list of applications on the portable storage device, where each of the applications has a private filesystem. For each of the applications, the portable storage device determines if that application will share the corresponding private filesystem and adds that private filesystem to a shared filesystem of the portable storage device is that is shareable. The portable storage device further advertises the shared filesystem to a host that is coupled to the portable storage device.

20 Claims, 15 Drawing Sheets

Related U.S. Application Data

(60) Provisional application No. 61/295,660, filed on Jan. 15, 2010.

(51) Int. Cl.

| | |
|---|---|
| *H04W 4/50* | (2018.01) |
| *G06F 13/38* | (2006.01) |
| *G06F 21/62* | (2013.01) |
| *G06F 21/74* | (2013.01) |
| *G06F 21/78* | (2013.01) |
| *G06F 9/4401* | (2018.01) |
| *H04W 4/00* | (2018.01) |
| *G06F 17/00* | (2006.01) |

(52) U.S. Cl.
CPC .. *G06F 17/30067* (2013.01); *G06F 17/30165* (2013.01); *G06F 21/629* (2013.01); *G06F 21/6218* (2013.01); *G06F 21/74* (2013.01); *G06F 21/78* (2013.01); *H04W 4/001* (2013.01); *H04W 4/50* (2018.02)

(56) References Cited

U.S. PATENT DOCUMENTS

| | | |
|---|---|---|
| 6,725,238 B1 | 4/2004 | Auvenshine |
| 6,754,725 B1 | 6/2004 | Wright et al. |
| 6,862,617 B1 | 3/2005 | Wu |
| 7,345,671 B2 | 3/2008 | Robbin et al. |
| 7,549,007 B1 | 6/2009 | Smith et al. |
| 7,712,086 B2 | 5/2010 | Hughes et al. |
| 7,783,665 B1 | 8/2010 | Tormasov et al. |
| 7,908,653 B2 | 3/2011 | Brickell et al. |
| 8,307,134 B2 | 11/2012 | Galloway et al. |
| 8,346,983 B2 | 1/2013 | Lim et al. |
| 8,510,838 B1 | 8/2013 | Sun et al. |
| 2003/0023954 A1* | 1/2003 | Wilkinson .............. G06F 8/443 717/118 |
| 2003/0035397 A1 | 2/2003 | Haller et al. |
| 2004/0111494 A1 | 6/2004 | Kostic et al. |
| 2004/0133797 A1* | 7/2004 | Arnold ................... G06F 21/10 726/27 |
| 2004/0157638 A1* | 8/2004 | Moran ................... G06Q 50/24 455/550.1 |
| 2004/0224638 A1 | 11/2004 | Fadell et al. |
| 2005/0015355 A1* | 1/2005 | Heller .............. G06F 17/30058 |
| 2005/0102537 A1 | 5/2005 | Zheng |
| 2005/0114406 A1 | 5/2005 | Borthakur et al. |
| 2005/0244037 A1 | 11/2005 | Chiu et al. |
| 2005/0246450 A1 | 11/2005 | Enko et al. |
| 2005/0289264 A1 | 12/2005 | Illowsky et al. |
| 2006/0123166 A1 | 6/2006 | Toebes et al. |
| 2006/0130004 A1 | 6/2006 | Hughes et al. |
| 2006/0190238 A1 | 8/2006 | Autor |
| 2006/0282571 A1 | 12/2006 | Choi et al. |
| 2007/0057048 A1 | 3/2007 | Plotkin et al. |
| 2007/0100701 A1 | 5/2007 | Boccon-Gibod et al. |
| 2007/0118609 A1 | 5/2007 | Mullan et al. |
| 2007/0282951 A1 | 12/2007 | Selimis et al. |
| 2007/0283094 A1 | 12/2007 | Narayanaswami et al. |
| 2007/0288614 A1 | 12/2007 | May et al. |
| 2008/0005260 A1 | 1/2008 | Belimpasakis et al. |
| 2008/0005472 A1 | 1/2008 | Khalidi et al. |
| 2008/0016339 A1 | 1/2008 | Shukla |
| 2008/0056500 A1 | 3/2008 | Bradley et al. |
| 2008/0126653 A1 | 5/2008 | King et al. |
| 2008/0168391 A1 | 7/2008 | Robbin et al. |
| 2008/0301430 A1 | 12/2008 | Bradley et al. |
| 2008/0304486 A1 | 12/2008 | Graessley et al. |
| 2008/0310394 A1 | 12/2008 | Hansen et al. |
| 2009/0011747 A1 | 1/2009 | Wood et al. |
| 2009/0063721 A1 | 3/2009 | Uno |
| 2009/0132676 A1 | 5/2009 | Tu et al. |
| 2009/0183146 A1 | 7/2009 | Zorn |
| 2009/0193155 A1 | 7/2009 | Skillman et al. |
| 2009/0232300 A1 | 9/2009 | Zucker et al. |
| 2009/0276771 A1 | 11/2009 | Nickolov et al. |
| 2010/0014459 A1 | 1/2010 | Mir et al. |
| 2010/0037206 A1 | 2/2010 | Larimore et al. |
| 2010/0037235 A1 | 2/2010 | Larimore et al. |
| 2010/0169271 A1* | 7/2010 | Yasui ................ G06F 17/30168 707/608 |
| 2010/0267368 A1 | 10/2010 | Masputra |
| 2010/0306270 A1 | 12/2010 | McDiarmid et al. |
| 2011/0035503 A1 | 2/2011 | Zaid et al. |
| 2011/0057891 A1 | 3/2011 | Ham et al. |
| 2011/0085667 A1 | 4/2011 | Berrios et al. |
| 2011/0179083 A1 | 7/2011 | Galloway et al. |
| 2013/0103860 A1 | 4/2013 | Galloway et al. |

FOREIGN PATENT DOCUMENTS

| | | |
|---|---|---|
| TW | 200307217 A | 12/2003 |
| TW | 200602977 | 1/2006 |
| TW | 200642206 | 12/2006 |
| TW | 200802102 A | 1/2008 |
| TW | 200923665 A | 6/2009 |
| WO | WO03017682 A2 | 2/2003 |
| WO | WO03017682 A3 | 11/2003 |
| WO | WO2006116190 A2 | 11/2006 |

OTHER PUBLICATIONS

"Major PSP firmware update adds tethering, Media Go", Crunch Gear, www.crunchgear.com/2009/09/30/major-psp-Firmware-update-adds-tethering-me- dia . . . , 1 pg.

PCT International Search Report and Written Opinion for PCT International Appln No. PCT/US2011/021195 dated May 16, 2011. (11 pages).

PCT International Search Report and Written Opinion for PCT International Appln No. PCT/US2011/021197 dated Apr. 20, 2011. (15 pages).

PCT International Search Report and Written Opinion for PCT International Appln No. PCT/US2011/021199 dated Apr. 19, 2011. (12 pages).

Symantec Corporation "E-security begins with sound security policies", Announcement Symantec, XX, XX, Jun. 14, 2001, XP002265695, 23 pgs.

Android Developers: Security and Permissions, Way Back Machine, http://developer.android.com/guide/topics/security/security.html, Feb. 13, 2009.

Australian Application No. 2011205255—Examiner's First Report dated May 29, 2013.

Taiwanese Patent Application No. 100101518—Office Action dated Dec. 26, 2013.

Chinese Application for Invention No. 201180010148.8—Office Action dated Jun. 18, 2014.

Chinese Application for Invention No. 201180010153.9—Office Action dated Jul. 2, 2014.

Taiwanese Patent Application No. 100101523—Office Action dated Dec. 27, 2013.

Australian Application No. 2011205255—Patent Examination Report No. 2 dated Sep. 13, 2013.

Canadian Application No. 2,786,447—Office Action dated Sep. 30, 2013.

Korean Application No. 10-2012-7021349—Office Action dated Sep. 10, 2013.

Taiwanese Application No. 100101522—Office Action dated Aug. 7, 2013.

European Patent Application No. 11702529.6—Office Action dated Mar. 17, 2014.

Canadian Patent Application No. 2786447—Examiner's Report dated Feb. 22, 2016.

\* cited by examiner

SPECIALIZED NETWORK FILESERVER

CROSS-REFERENCE TO RELATED APPLICATIONS

This application is a continuation of U.S. application Ser. No. 12/895,481, filed Sep. 30, 2010, of the same title, now U.S. Pat. No. 9,052,919, issued Jun. 9, 2015, which claims the benefit of U.S. Provisional Application No. 61/295,660 filed Jan. 15, 2010, of the same title, the contents of which are incorporated herein by reference in their entirety for all purposes.

FIELD

This invention relates generally to coupling devices and more particularly to creating a storage interface between a portable storage device and host.

BACKGROUND

A portable storage device, such as a portable music player, smartphone, etc., can be connected with a host, such as a personal computer or laptop over a universal serial bus (USB) link. When these two devices are connected, information between the host and the portable storage device can be communicated using a vendor-specific packet-oriented multiplexing protocol. For example, multimedia files, applications, contact information, etc. can be transferred between the two devices.

In one scenario, the host and portable storage device can multiplex USB and transmission control protocol (TCP)/Internet protocol (IP) communications over the USB link coupling the two devices. In this scenario, a network interface is configured on the USB link to enable TCP/IP-type communication over the USB link. This network interface can be used to communicate TCP/IP packets on this link. By enabling the TCP/IP-type communication, a disruption in the link can be gracefully handled. For example, an application on each of the host and the portable storage can establish a TCP session between these two applications, which is used to communicate data between the two applications. The TCP stack notifies the applications if there is a disconnection in the session, presumably caused by a disconnection in the underlying USB link. The host and portable device applications can use the notifications to gracefully recover from the communication disruption.

SUMMARY

A method and apparatus of a portable storage device that provides a specialized network fileserver is described. In an exemplary method, the portable storage device retrieves a list of applications on the portable storage device, where each of the applications has a private filesystem. For each of the applications, the portable storage device determines if that application will share the corresponding private filesystem and adds that private filesystem to a shared filesystem of the portable storage device is that is shareable. The portable storage device further advertises the shared filesystem to a host that is coupled to the portable storage device. Other aspects and advantages of the invention will become apparent from the following detailed description taken in conjunction with the accompanying drawings which illustrate, by way of example, the principles of the described embodiments.

In one embodiment, a portable storage device is configured to enable a tethering interface and a portable storage interface on a link interface. In response to detecting a host coupled to that link, the method configures the tethering interface to allow the host access to a network and configures the portable storage interface to share files between the host and the portable storage device. The method further communicates data between the host and the network with the tethering interface and shares files stored on the portable storage device with the host through the portable storage interface.

In another embodiment, the portable storage device retrieves a list of a plurality of applications resident on the portable storage device, where each of the plurality of applications has a private filesystem of files. For the each of the plurality of applications, the portable storage device determines if that application will share its private filesystem to a shared filesystem of the portable storage device. The portable storage device further adds to the shared filesystem a link to the private filesystem of that application if the private filesystem is shareable. In addition, the portable storage device advertises the shared filesystem of the portable storage device to a host that is coupled to the portable storage device.

In a further embodiment, the portable storage device receives a request to access the shared filesystem from the host, where the shared filesystem includes files that correspond to a plurality of applications on the portable storage device and a security policy that disallows one of the plurality of applications from accessing a file in the shared filesystem that corresponds to another one or many of the plurality of applications. In addition, the portable storage device fulfills that request.

In another embodiment, the host transmits a request to access the shared filesystem from the host, where the shared filesystem includes files that correspond to a plurality of applications on the portable storage device and a security policy that disallows one of the plurality of applications from accessing a file in the shared filesystem that corresponds to another one or many of the plurality of applications. In addition, the host receives an indication of the result of the request.

In one embodiment, the host receives an advertisement from a portable storage service that a shared filesystem is available for use. The host determines if the portable storage device corresponding to the advertised portable storage services is known to the host. If the portable storage device is known to the host, the host receives an internet protocol (IP) address to configure a portable storage interface on the host. Once this interface is configured, the host transmits a request to the portable storage service to mount a shared filesystem of the portable storage service for the host. The host receives a notification that the shared filesystem is mounted and applications resident on the host can access the files in the shared filesystem.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a portable storage device that provides a tethering and a portable storage service to a host is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The term "host" and the term "portable storage device" are intended to refer generally to data processing systems rather than specifically to a particular form factor for the host versus a form factor for the device.

A method and apparatus of a portable storage device that provides a tethering and a portable storage service to a host is described. In an exemplary method, the portable storage device configures a tethering and a portable storage service interface for the host. The portable storage device provides the tethering service to a network for the host through the tethering interface. In addition, the portable storage device shares files stored on the portable storage device through the portable storage interface.

Figure 1:
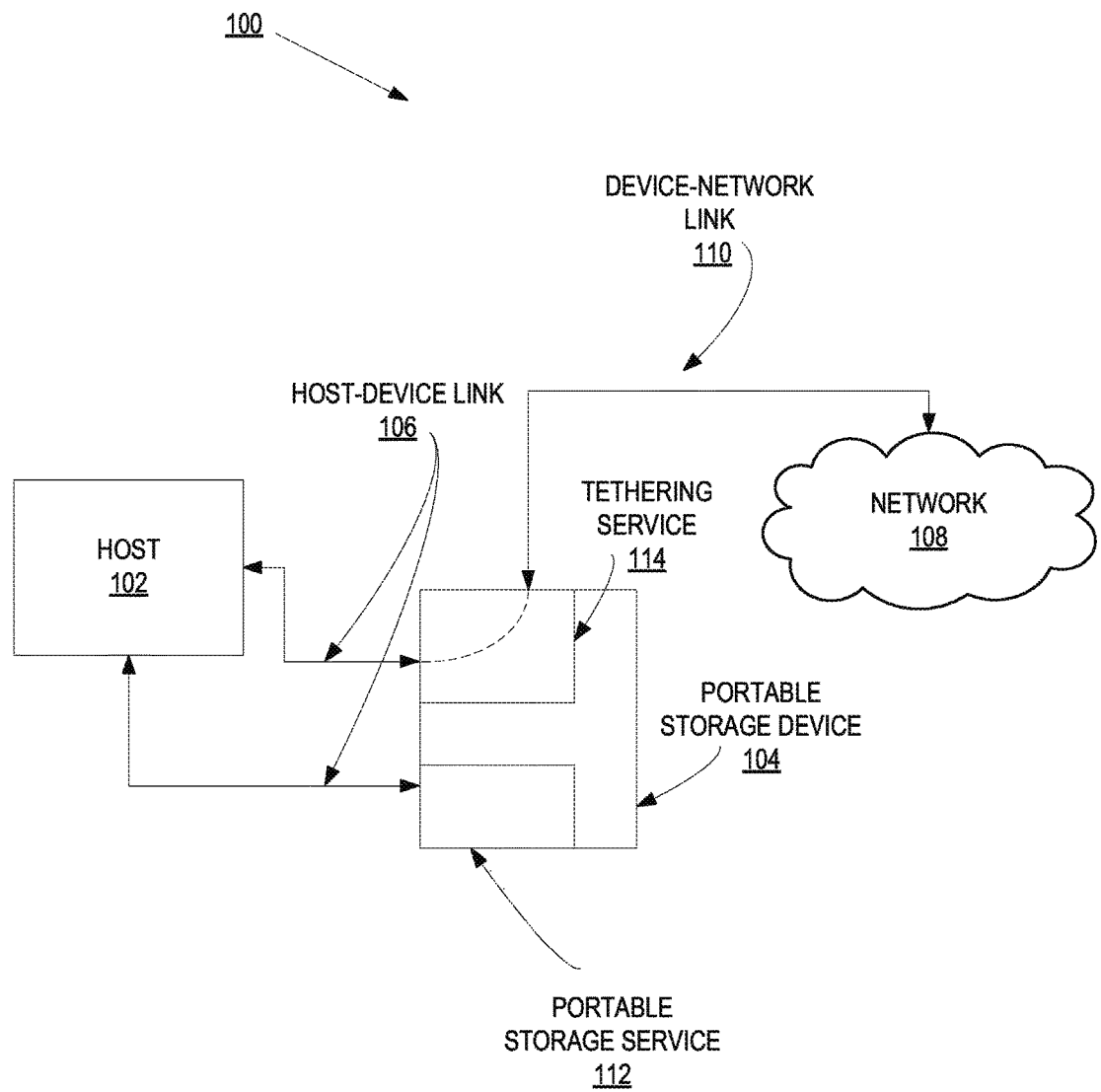
FIG. 1 is a block diagram of one embodiment of a portable storage device that couples to a host and can provide a tether and a portable storage service for the host.

FIG. 1 is a block diagram of one embodiment of a portable storage device 104 that couples to a host 102 and can provide tethering for the host 102. As is known in the art, tethering is the use of a mobile device (e.g., the portable storage device) to supply network access for another device (e.g., the host). In FIG. 1, the portable storage device 104 couples to the host 102 via a host-device link 106. A host 102 is one of a personal computer, smartphone, cellular phone, music player, laptop, notebook, tablet, personal digital assistant, netbook, palmtop computer, server, etc. Portable storage device 104 is a mobile device capable of storing data, such as smartphone, mobile player, cellularphone, tablet, laptop, notebook, etc. While in one embodiment, the host-device link 106 is a universal serial bus (USB), in alternate embodiments, the host-device link 106 is another type of link capable of communicating data between the host 102 and the portable storage device 104 (Firewire, Ethernet, wireless, serial connection, Bluetooth®, etc.). For example, and in one embodiment, the host 102 is a laptop or other type of personal computer and the portable storage device 104 is a smartphone or tablet that is coupled to the host 102 using a USB link.

In one embodiment, the portable storage device provides two services to the host, a tethering service 114 and a portable storage service 112 over the host-device link 106. The tethering service 114 provides network access to network 108 for the host 102 via the portable storage device 104. The portable storage service 112 provides access for the host 102 to files stored on the portable storage device 104.

In one embodiment, the portable storage device 104 is coupled to a network 108 via device-network link 110. In one embodiment, network 108 is a wide-area-network that provides network services to the portable storage device 104 and/or host 102. For example, and in one embodiment, network 108 is the Internet, a cellular network (3G, etc.), or other type of wide area network known in the art. Device-network link 110 is type of link that corresponds to the type of network 108. For example, and in one embodiment, device-network link 110 is a 3G wireless link, Wi-fi wireless link, WIMAX link, etc. In one embodiment, by coupling the portable storage device 104 to the network 108, the portable storage device 104 can tether the host 102 via the tethering service 114 to the network 108 in order to provide access to network services supported by network 108. In this embodiment, the host-device link 106 is utilized to communicate data between the host 102 and network 108. Setting up the host-device link 110 to tether the host 102 to the network 108 is further discussed in FIGS. 2, 3, and 6 below.

In another embodiment, portable storage device 104 includes file storage that is accessible by host 102 via the host-device link 106 storage and the portable storage service 112. In this embodiment, a fileserver is resident on the portable storage device that can allow access to a filesystem on the portable storage device 104.

Figure 2:
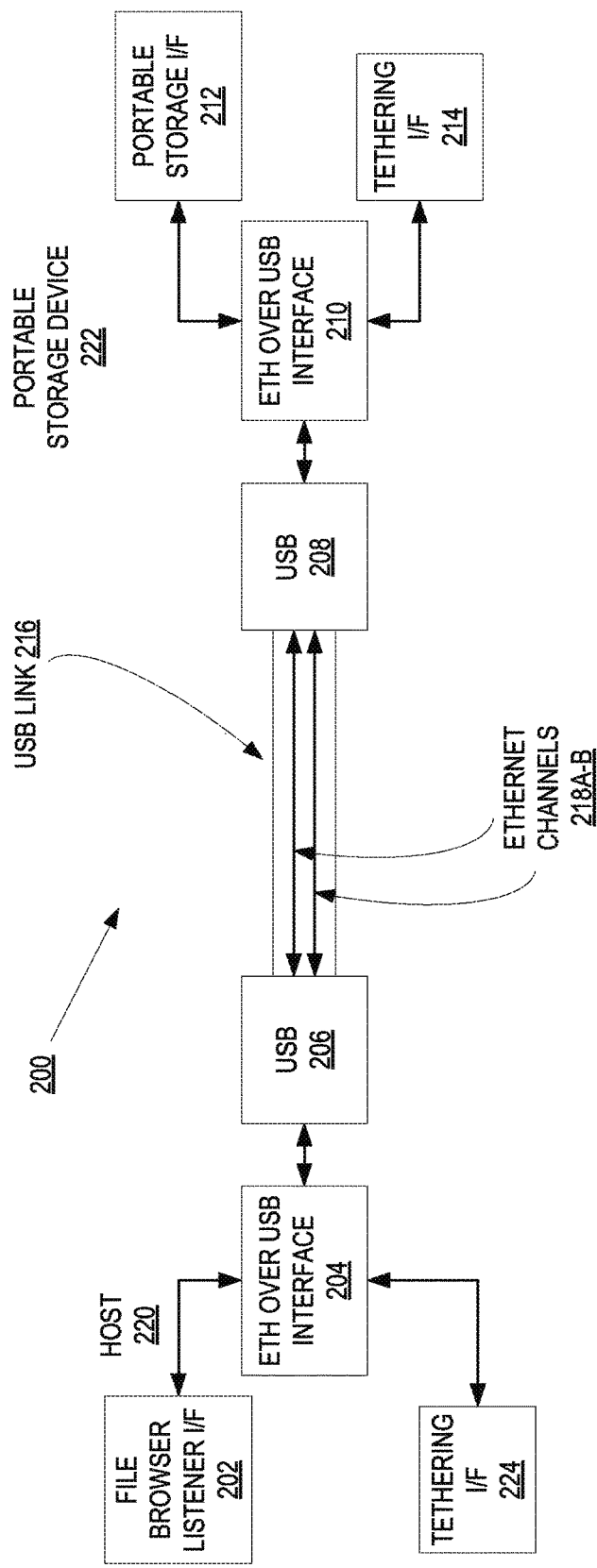
FIG. 2 is a block diagram of one embodiment of a connection between the portable storage device and the host.

As described above, the host-device link 106 can support access by the host 102 to the filesystem on the portable storage device 104 and access for host 102 to the network 108 via the portable storage device 104. In one embodiment, two communication channels are created on the host-device link 106 to support these functions. FIG. 2 is a block diagram of one embodiment of a connection 216 between the portable storage device 222 and the host 220 that supports tethering and filesystem access. In FIG. 2, host 220 comprises listener interface 202, tethering interface 224, Ethernet over USB interface 204, and USB interface 206. Portable storage device 222 comprises portable storage interface 212, tethering interface 214, Ethernet over USB interface 210, and USB interface 208. In this embodiment, the host 220 and the portable storage device 222 are connected by a USB link that includes these two Ethernet channels 218A-B.

In one embodiment, one of the Ethernet channels is used for the tethering function and the other is used to provide fileserver functionality. For example and in one embodiment, Ethernet channel 218A is used to provide the tethering service to the host 220 and Ethernet channel 218B is used to provide fileserver access for the host. In this embodiment, Ethernet channel 218A couples the tethering interface 224 on the host 220 and tethering interface 214 on the portable storage device 222. In addition, Ethernet channel 218B couples file browser listener interface 202 on the host 220 and portable storage interface 212 on the portable storage device 222.

In this embodiment, internet protocol (IP) addresses are assigned to each Ethernet interface in order to allow data to be communicated over the each Ethernet channel. For example and in one embodiment, an IP address is assigned to interfaces 202 and 224. In one embodiment, other network functions interface 224 is assigned an IP address that corresponds to Ethernet channel 218A and allows data communicated over Ethernet channel 218A to reach network that is tethered to portable storage device 222. For example and in one embodiment, tethering interface 224 is assigned a public IP address or a private address known to network 108. In another embodiment, file browser listener interface 202 is assigned an IP address that corresponds to Ethernet channel 218B and allows host 220 to access a shared filesystem on portable storage device 222. For example and in one embodiment, file browser listener interface 202 is assigned a private IP address that is used for the shared filesystem, but does not allow the host 220 to access other network services (e.g., tethering) across this interface. In one embodiment, the Ethernet interfaces for each of the two Ethernet channels are assigned IP addresses that are from two different networks. For example and in one embodiment, the tethering network has addresses that allow the host 102 to access the network 108. The file sharing network has private addresses that are used for the file sharing between the host 102 and portable storage device 104.

Figure 3:
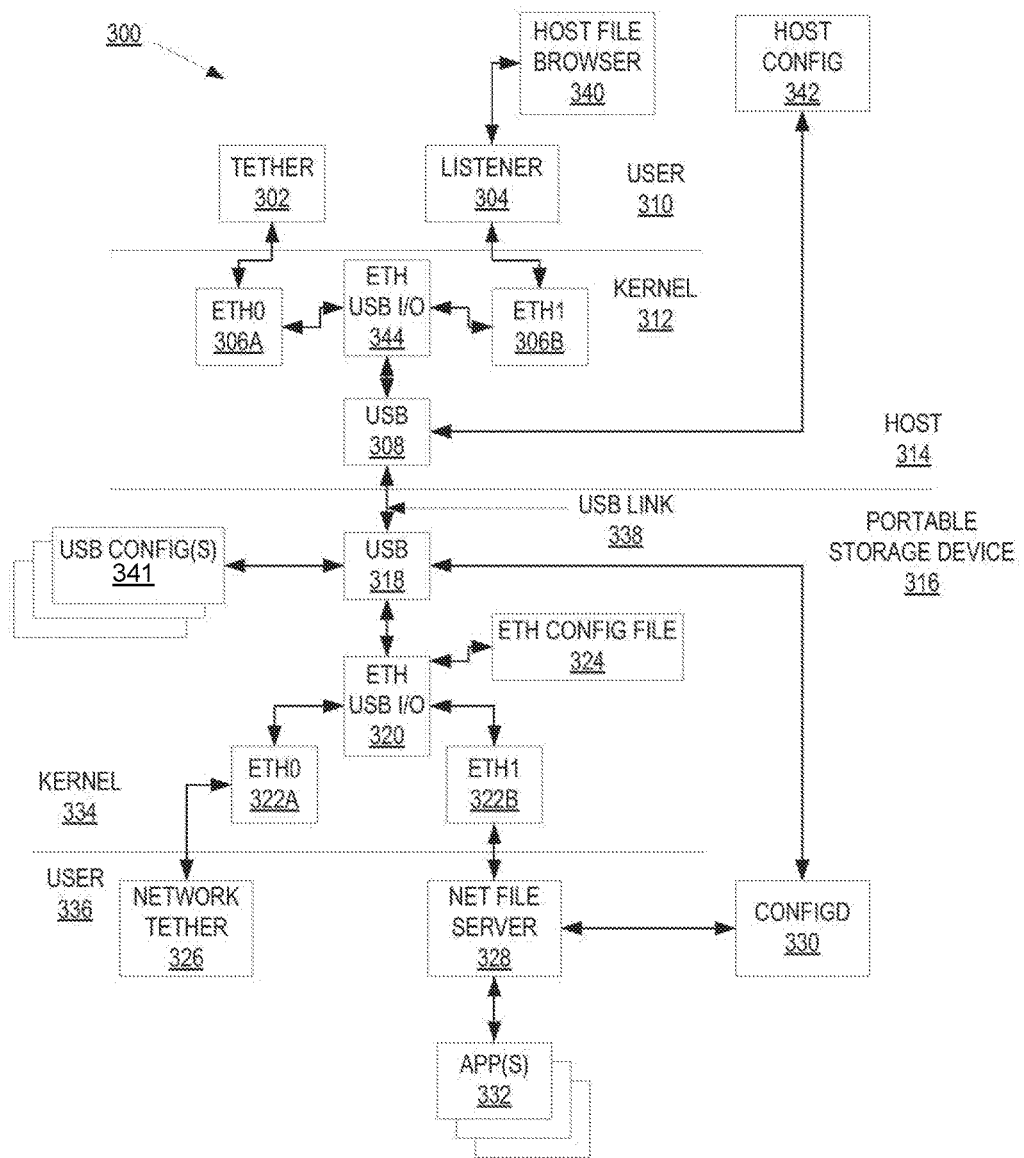
FIG. 3 is a block diagram of one embodiment of system components that utilize the portable storage device-host connection.

FIG. 3 is a block diagram of one embodiment of system components that utilize the portable storage device-host connection. In FIG. 3, the host 314 is coupled to a portable storage device 316 with a USB link 338. In one embodiment, the host 314 is host 102 of FIG. 1 that couples with the portable storage device 104 to access network 108 and the portable storage service 112 of the portable storage device 104. The host 314 includes a USB interface 308, Ethernet input/output interface 344, and two Ethernet interfaces 306A-B in kernel space 312 and a set of components in user space 310. In one embodiment, Ethernet input/output 344 is an Ethernet over USB interface, such as Ethernet over USB interface 204 as described in FIG. 2 above. The individual Ethernet interfaces 306A-B are defined on top of Ethernet input/output 344. In one embodiment, this set of components includes a tether component 302, listener 304, and host file browser 340. The tether component 302 uses Ethernet interface eth1 306A to tether with the portable storage device 316 as described above in FIGS. 1 and 2. Listener 304 listens for filesystem advertisements. If the listener 304 receives a filesystem advertisement, listener 306 mounts the filesystem as a shared volume on host 314. For example and in one embodiment, listener 304 listens for a new filesystem that is mounted and shared on the portable storage device 316. File browser 340 makes requests to the shared filesystem on the portable storage device 316. In one embodiment, user space is a memory and operating mode where user programs and applications run, e.g. a word processing application. Kernel space is where the operating system itself and device drivers run, which has full privileges to access the hardware.

The portable storage device 316 includes a USB interface 318, the Ethernet input/output 320, and two Ethernet interfaces 322A-B in kernel space 334 and a set of components in user space 336. In one embodiment, Ethernet input/output 320 is an Ethernet over USB interface, such as Ethernet over USB interface 210 as described in FIG. 2 above. The individual Ethernet interfaces 322A-B are defined on top of Ethernet input/output 320. In one embodiment, the portable storage device 316 is a device that provides tethering and portable storage services to the host 314. In one embodiment, the set of components on the portable storage device 316 include tether 326, network file server 328, a set of applications 332, and a configuration process, configd, 330. Tether component 326 uses the Ethernet eth0 interface 322A to provide tethering services to the host 314. In one embodiment, network file server 332 builds and exports the shared filesystem for the portable storage device 316 that is used by the host 314. Network file server 328 builds the filesystem by determining which of the applications will share the files in the private filesystem of those applications 332 and adds links to each of those shared private filesystems. In this embodiment, each application resident on the portable storage device 316 has its own private filesystem that is not shared with other applications on the portable storage device 316. Further discussion of how the network file server 328 builds and exports the shared filesystem is in FIGS. 4 and 5 below.

The portable storage device 316 further includes a set of USB configuration files 341 and an Ethernet configuration file 324. In one embodiment, the different USB configuration files are used for different configurations of the USB link. For example and in one embodiment, there is a configuration for the USB having two Ethernet channel on the USB link (e.g., tethering and file serving Ethernet channel), one Ethernet channel on the USB link (e.g. tethering or file serving Ethernet channel), and no Ethernet channels (e.g., USB link configured to have USB capability as known in the art). In one embodiment, the USB configuration is chosen based on the model of the portable storage device (e.g. media player, smartphone, etc), and the services running on the device. For example and in one embodiment, when tethering is turned on through preferences on the device, then the portable device operating system will select the USB configuration that includes the tethering interface. In one embodiment, the Ethernet configuration file is used to attach a property to each of the Ethernet interfaces 322A and 332B to indicate which one of the interfaces 3222A-B is the tethering interface and which is the portable storage interface. This property is then examined by the configd 330 so that it can attach the portable storage user space daemon to the correct Ethernet interface.

In one embodiment, the user space configuration daemon configd 330 configures the Network file server based on the USB configuration files used to configure the USB link. In one embodiment, configd 330 configures and starts the Network file server 328 upon coupling of the portable storage device 316 to the host 314. In an alternate embodiment, configd 330 configures and starts the Network file server upon the portable storage device 316 booting up. In a further embodiment, configd 330 configures and starts the Network file server if the USB link is configured (or to be configured) with an Ethernet channel that is used for file serving.

Figure 4:
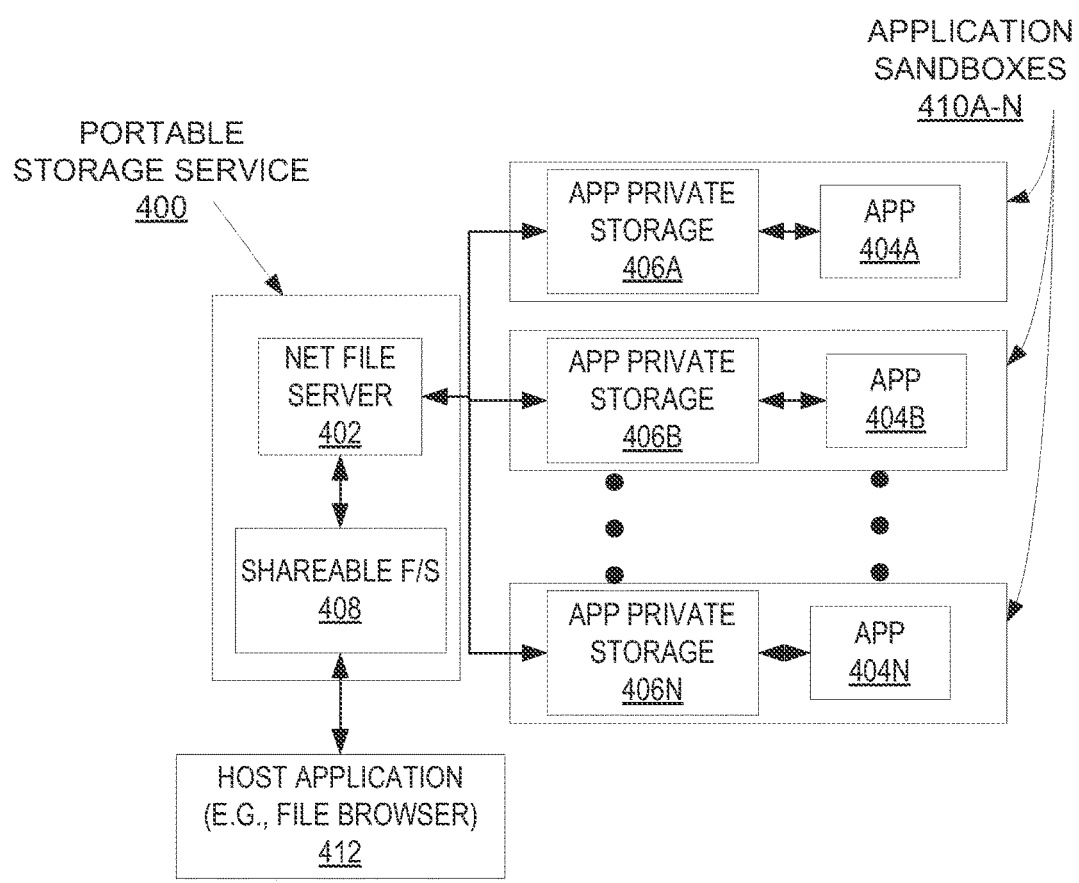
FIG. 4 is a block diagram of one embodiment of a portable storage service on the portable storage device.

As described above, the portable storage device can include a portable storage service resident on the portable storage device. In one embodiment, the portable storage service is a network file server and the shared filesystem used by the portable storage service is constructed from the private file systems of applications resident on the portable storage device. FIG. 4 is a block diagram of one embodiment of a portable storage service 400 on the portable storage device. In FIG. 4, the portable storage service 400 includes network file server 402 and a shared filesystem that is coupled to applications 404A-N, application private storage 406A-N, application sandboxes 410A-N, and a host application 412 that can access the shared filesystem 408. An application 404A-N can be any type of application known in the art that can be run on a computer or portable storage device (e.g., e-mail, web browsing, multimedia use/manipulation, note taking, work processing, spreadsheet, etc.). In one embodiment, an application private storage 406A-N includes files that are used by the application, such as user-created documents, library files, object files, executables, configuration files, cached data, database files, images displayed by the application etc. In one embodiment, each application 404A-N and corresponding private storage 406A-N is enclosed within an application sandbox 410A-N that prevents an application from accessing files created by another application. For example and in one embodiment, application 404A access files in application private storage 406A, but cannot access files in another application private storage 406B-N.

In one embodiment, the network file server 402 constructs the shared filesystem 408 from the applications 404A-N and the corresponding application private storage 406A-N. In one embodiment, for each application 404A-N that allows access to the corresponding private storage 406A-N, the network file server 402 adds a link to the shared filesystem 408 for that accessible private storage. For example and in one embodiment, the network file server 402 links to the application private storage 406A-N for each application 404A-N that participates in the portable storage service 400. This added link can allow access to a part or all of the application's private storage 406A-N. In one embodiment, the added link allows access to user-created files in the application private storage. For example and in one embodiment, a note-taking application on the portable storage device creates and stores user created notes in files in the private storage for that note-taking application. If the note-taking application is configured to share the user created notes, network file server 402 links the shared filesystem 408 to a directory in the note taking application private storage that stores the user created notes. In this embodiment, the user created notes can be accessed by the host application 412.

Once the network file server 402 constructs the shared filesystem 408, the network file server 402 advertises the existence of the shared filesystem 408 to the host. In one embodiment, portable storage service uses the Bonjour service discovery protocol to advertise the portable storage service 400 to the host. In this embodiment, the host receives the advertisements and sends a request to the network file server 402 to mount the shared filesystem 408.

Figure 5:
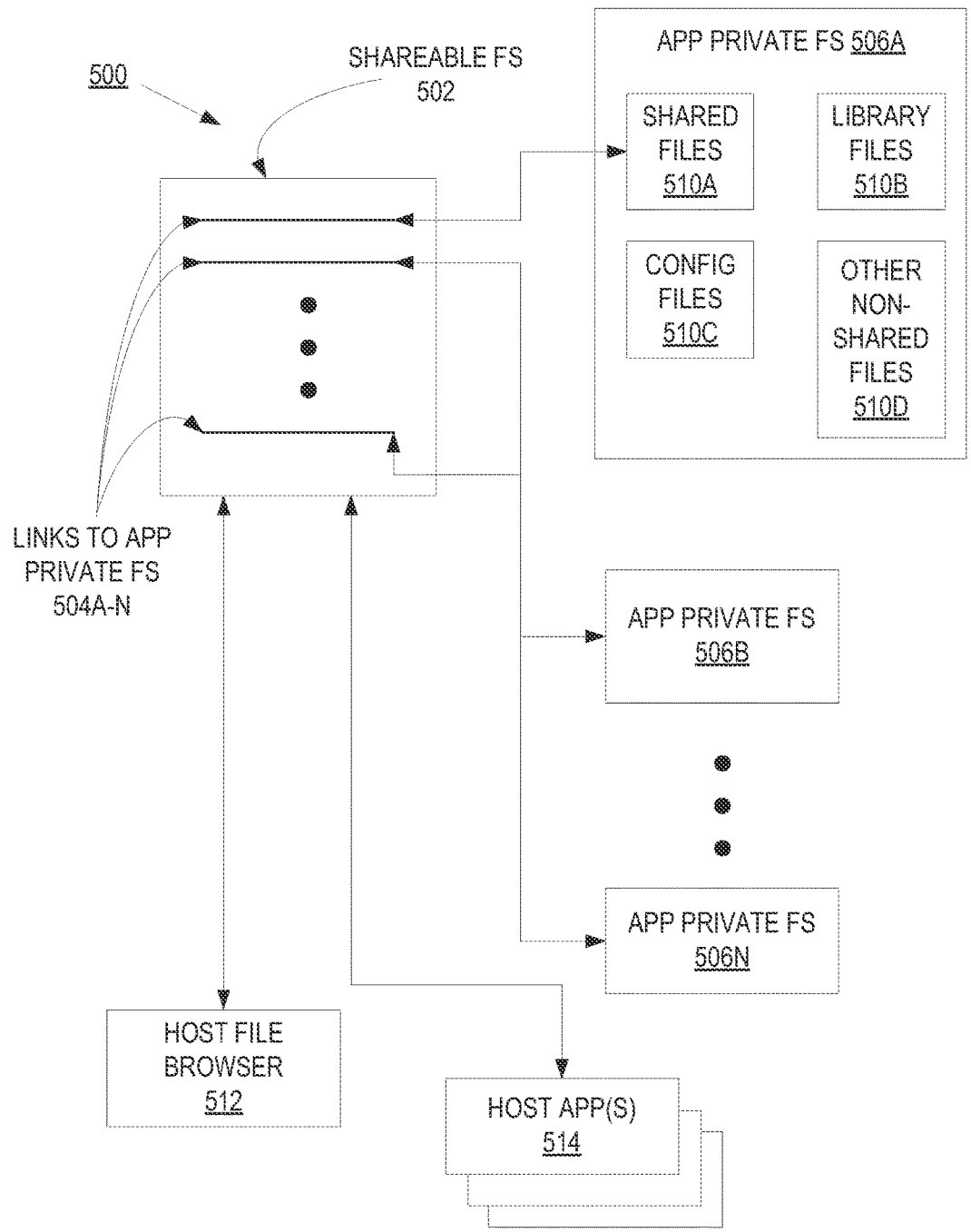
FIG. 5 is a block diagram of one embodiment of a shared filesystem in the portable storage device.

As described above, the shared filesystem of the portable storage service is constructed by linking to the private storage of applications that participate in the portable storage service. FIG. 5 is a block diagram of one embodiment of a shared filesystem 502 on the portable storage device. In FIG. 5, the shared filesystem 502 links to application private filesystems 506A-N. Each of the links 504A-N is used to construct the shared filesystem 502. In one embodiment, the network file server 502 advertises this shared filesystem 502 to the host coupled to the client.

In one embodiment, the network file server 502 links to part of an application private filesystem 506A. In this embodiment, the application private filesystem 506A includes shared files 510A, library files 510B, configuration files 510C, and other non-shared files 510D. In one embodiment, the shared files 510A are user-created files that have been created using the corresponding application on the client. Alternatively, these user-created files were created on another device (e.g., the host or some other device, etc.) and downloaded via the shared filesystem 502 to the shared files 510A portion of the application private filesystem 506A. In one embodiment, the shared files 510A is a directory in the application private filesystem 506A. By linking to the shared files 510A, a host can access the files in the shared files 510A via the shared volume 508.

In one embodiment, an application 514 on the host can access files on the client via the shared filesystem 502. In this embodiment, the application 514 can perform any of the operations on these files that are known in the art (e.g., reading from, writing to, listing file characteristics, creating, deleting, etc.). In another embodiment, some of the file operations are restricted as known in the art (e.g., able to read the file, but not write to the file, etc.). In another embodiment, a host application of a different type can perform file operations on one of the shared file associated with a different type of application. For example and in one embodiment, a word processing application on the host could access files through the shared filesystem 502 that are associated with a note-taking application resident on the client. In addition, in one embodiment, a word processing application resident on the client that is the same as the one on the host would not be able to access those files because of the security sandbox that envelops each of the applications resident on the client. In another embodiment, the one type of application on the host can access application files 506A-N on the client associated with the same type of client. For example and in one embodiment, a note-taking application on the host could access files through the shared filesystem 502 that are associated with a note-taking application resident on the client. In one embodiment, the same type of application can mean two applications the same type of functionality on the host and client, but these programs are specialized for one or both devices. For example and in one embodiment, a photo processing application on the host can access files of a specialized version of that photo processing program that is resident on the client.

Figure 6:
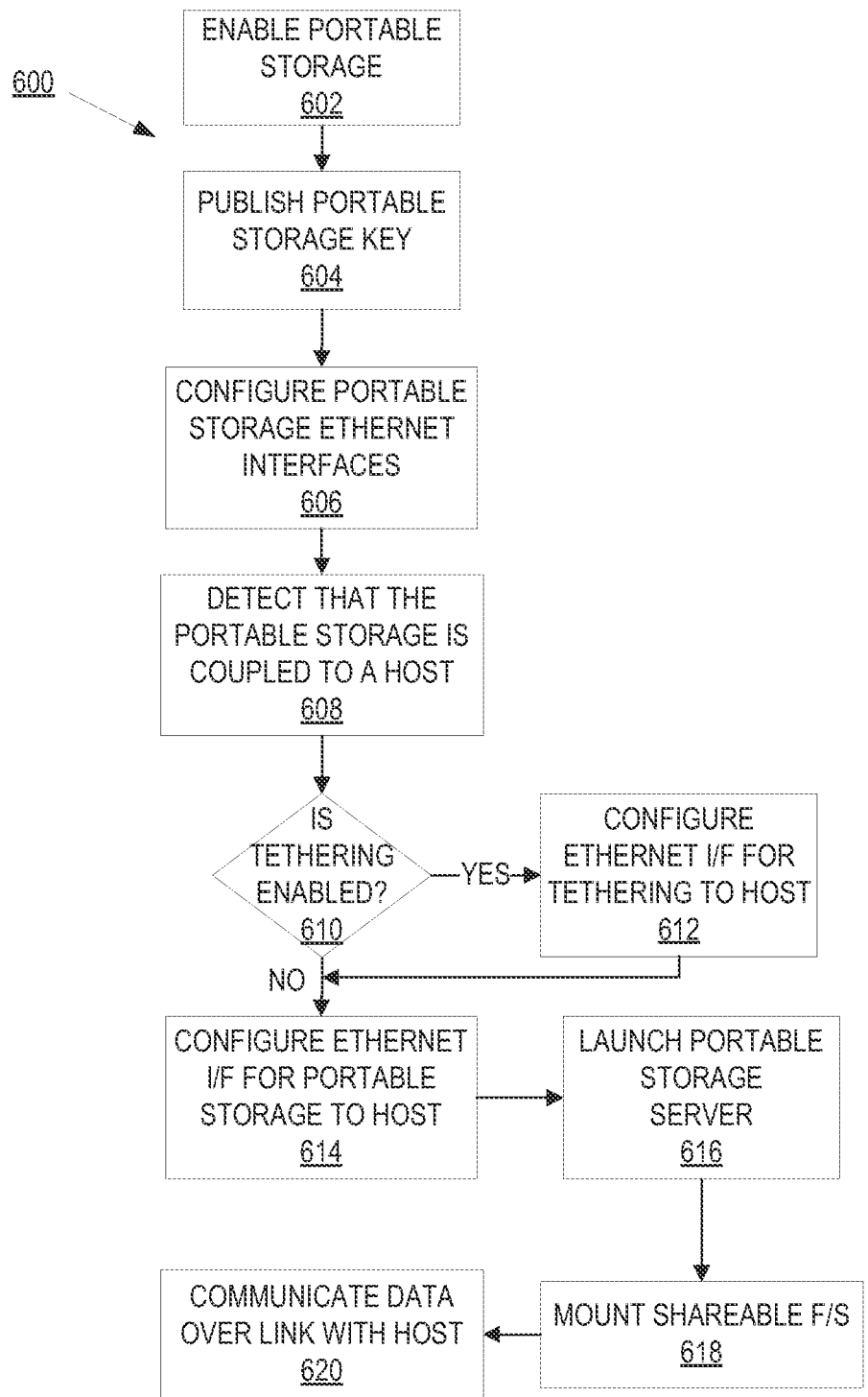
FIG. 6 is a flow diagram of one embodiment of a process to create a dual Ethernet channel connection between the portable storage device and the host.

FIG. 6 is a flow diagram of one embodiment of a process 600 to create a dual Ethernet channel connection between the portable storage device and the host. In FIG. 6, process 600 enables portable storage on the portable storage device at block 602. In one embodiment, a configuration variable is set to "true." At block 604, process 600 publishes a portable storage key that signals to the configuration daemon that the storage server is enabled. In one embodiment, when the portable storage device boots up, process 600 inspects that configuration variable and publishes the key.

Process 600 configures the portable storage Ethernet interface at block 606. In one embodiment, process 600 changes the portable storage device's USB configuration to include an Ethernet profile. In this embodiment, including the Ethernet profile in the USB configuration allows the USB interface to be configured with Ethernet running on top of the USB link as described with reference to FIGS. 1 and 2 above. In one embodiment, the Ethernet interface is not quite up and running, but will come up when until the host couples with the portable storage device.

At block 608, process 600 detects that the portable storage device 608 is coupled to the host. In one embodiment, process 600 detects the coupling by detecting a physical USB connection being made to the USB interface of the portable storage device. In another embodiment, the host detects that the device has joined the local area network by receiving network packets over WiFi or Ethernet interfaces Process 600 determines if tethering is enabled at block 610. In one embodiment, process 600 determines if tethering is enabled by querying a configuration parameter or key for tethering. If tethering is not enabled, execution proceeds to block 614. If tethering is enabled, process 600 configures the Ethernet interface for tethering to the host on the USB link at block 612. In one embodiment, process 600 brings this interface up and assigns an IP address suitable to support the tethering functionality. In one embodiment, process 600 receives an IP address and other configuration information (nameserver address, gateway, etc.) from a network that is being used for the tethering and assigns this IP address to the tethering Ethernet interface. Execution proceeds to block 614.

At block 614, process 600 configures an Ethernet interface for the portable storage service. In one embodiment, assigns a private IP address that is to be used on a private network between the portable storage device and the host for file sharing. For example and in one embodiment, process 600 assigns an IP address of 192.168.20.1.

Process 600 launches the portable storage server at block 616. In one embodiment, process 600 creates a file that signals the network file server to start. When this file exists, the portable storage Ethernet interface is up and available to use. In addition, process 600 launches the network file server and turns on the Dynamic Host Configuration Protocol (DHCP) server on the portable storage device. In one embodiment, this DHCP server is used to assign a private IP address to the host Ethernet interface used for the file serving as described in FIG. 2 above. In addition, process 600 advertises the portable storage service. In one embodiment, the portable storage service is the shared filesystem served by the network file server as described above with reference to FIG. 4 above. In one embodiment, process 600 advertises the portable storage service with a service discovery protocol known in the art (e.g., Bonjour, Zeroconf, universal plug and play (UPnP), etc.).

Furthermore, process 600 builds the sharable filesystem used by the network file server at block 616. In one embodiment, for each application resident on the portable storage device that wants to opt-in to the portable storage service, the network file server creates a link to the shared files for that application. Building of the shared filesystem is further described in FIG. 7 below.

At block 618, process 600 mounts the shared filesystem so that the host can in turn mount the shared filesystem on the host. In one embodiment, an SMB client on the host mounts one volume from a shared volume on each portable storage device coupled to the host. In one embodiment, upon the host coupling with the portable storage device, process 600 communicates the data associated with the tethering and portable storage service over the USB link and corresponding Ethernet channels with the host at block 620.

Figure 7:
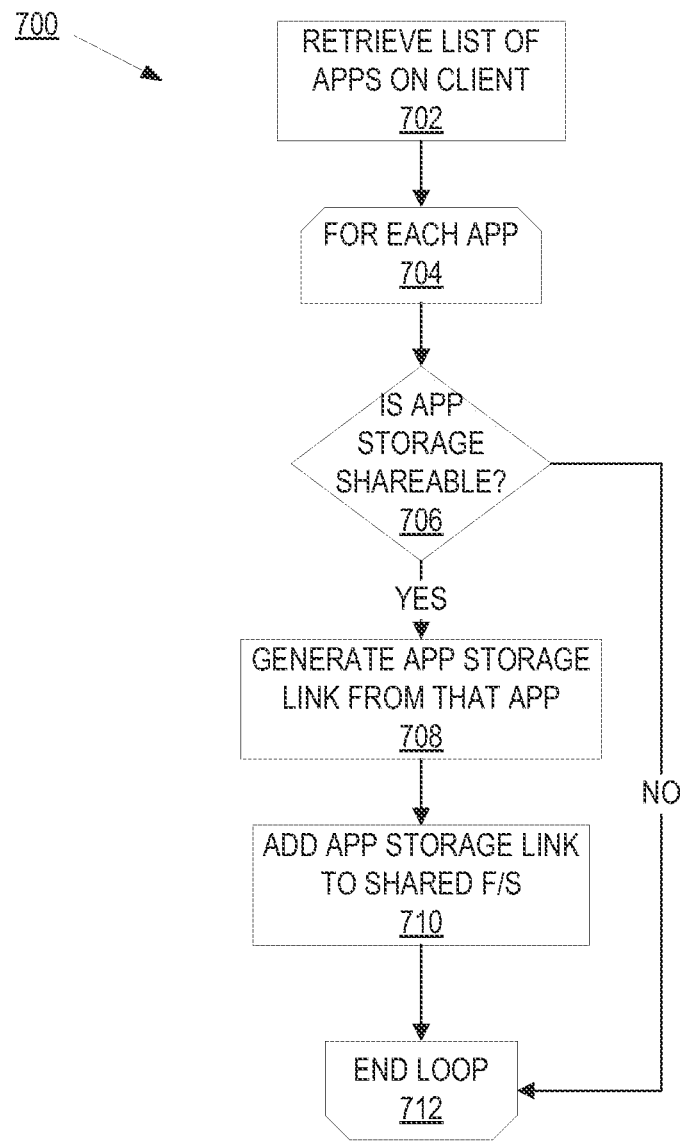
FIG. 7 is a flow diagram of one embodiment of a process to build the shared filesystem on the portable storage device.

As described above, the process 600 builds a shared filesystem for the portable storage service. FIG. 7 is a flow diagram of one embodiment of a process 700 to build the shared filesystem on the portable storage device. In one embodiment, process 700 is executed by process 600 at block 616 in FIG. 6 above. In FIG. 7, process 700 retrieves the list of applications resident on the portable storage device. In one embodiment, the server on the portable storage device gets the list from an application installation service built into the portable storage device operating system. It receives information about each application, including the flag that says whether the application participates in portable storage service. Process 700 further executes a processing loop (blocks 704-712) to generate a set of links to the applications shared files. At block 706, process 700 determines if an application will shares its files. In one embodiment, an application that shares its files adds a key to an application configuration file to indicate the application file sharing is turned on. In this embodiment, process 700 reads this key that indicates this application wishes to shares that files. If the key is present, execution proceeds to block 708. If this key is not present, the application does not share its files and execution proceeds to block 712.

At block 708, process 700 generates a link to the directory of the shared files of the application. In one embodiment, the shared files directory is a directory created when the application sets the key indicating that its files are shareable. Process 700 adds the application storage link to the shared filesystem at block 710. The processing loop ends at block 712.

Figure 8:
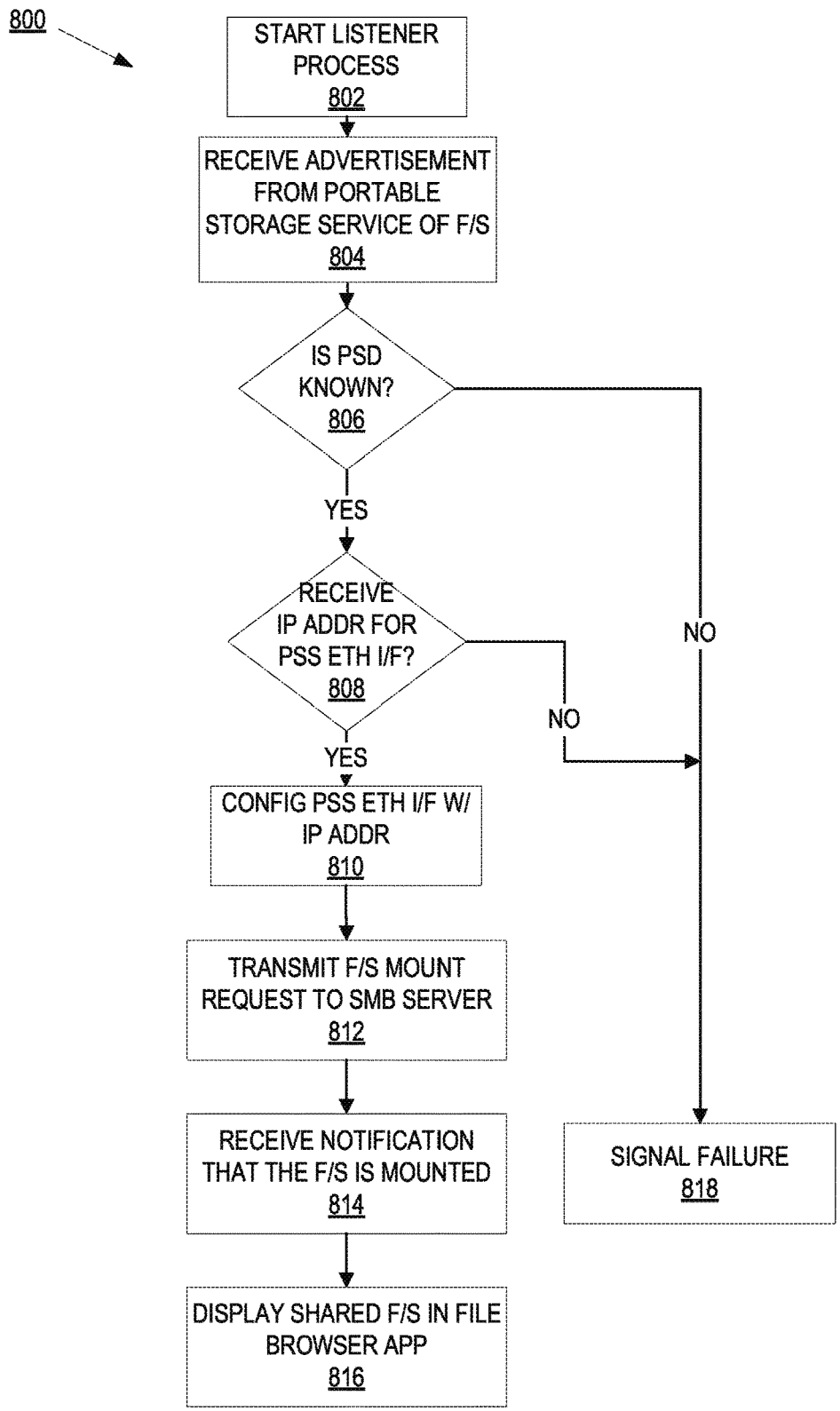
FIG. 8 is a flow diagram of one embodiment of a process to configure the host so as to be able to access the shared filesystem on the portable storage device.

With the portable storage service started and the storage Ethernet interface available, the host will configure itself to take advantage of the portable storage service. FIG. 8 is flow diagrams of one embodiment of a process 800 to configure the host so as to be able to access the shared filesystem on the portable storage device. In one embodiment, on the host side, a listener executes process 800. At block 802, process 800 starts a listening process. In one embodiment, the listening process listens for the service discovery protocol advertisements of the portable storage service.

Process 800 receives an advertisement of the portable storage service at block 804. In one embodiment, the advertisement is an advertisement using a service discovery protocol known in the art (Bonjour, Zeroconf, etc.). In another embodiment, the advertisement includes an identifier of the portable storage device. For example and in one embodiment, the received advertisement identifier is the serial number of the portable storage device.

At block 806, process 800 determines if the portable storage device is known to process 800. In one embodiment, process compares the portable storage device identifier received in the advertisement with a list of known devices. For example and in one embodiment, process 800 determines if the portable storage device has been paired with the host. If the portable storage device is not known to process 800, process 800 signals a failure at block 818 For example an in one embodiment, if the portable storage device is not paired with the host, the network interface on the device will not be activated by configd, and no connection will be possible from the host.

If the portable storage device is known to process 800, process 800 waits to receive an IP address that can be used to configure the portable storage Ethernet interface at block 808. If process 800 does not receive an IP address, process 800 signals a failure at block 818. However, if process 800 receives the IP address, process 800 configures the portable storage Ethernet interface at block 810. In one embodiment, process 800 applies the received IP address along with other configuration information for that interface as described above in FIG. 3 (nameserver address, gateway, etc.).

At block 812, process 800 transmits a mount request to the portable storage service to mount the shared filesystem on the host. In one embodiment, process 800 sends a request using the user name "guest" and no password. In this embodiment, no username and password is used because portable storage device is known to the host. Process 800 receives a notification that the shared filesystem is mounted at block 814. At block 816, process 800 displays the shared filesystem in a file browser application running on the host. In one embodiment, the shared filesystem is also available to other applications running on the host.

Figure 9:
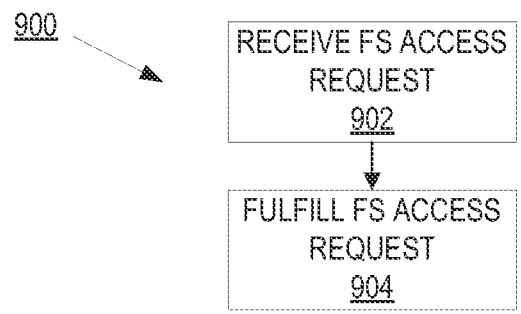
FIG. 9 is a flow diagram of one embodiment of a process to respond to access request for the shared filesystem on the portable storage device.

FIG. 9 is flow diagrams of one embodiment of a process 900 to respond to an access request for the shared filesystem on the portable storage device. In one embodiment, process 900 receives requests from an application on the host. In this embodiment, process 900 does not receive filesystem request from applications on the portable storage device because the portable storage service is made available to the host and not to applications running on the portable storage device. In FIG. 9, at block 902, process 900 receives a filesystem access request. In one embodiment, the filesystem request is a SMB request to access the sharable filesystem. As is known in the art, a SMB request can be used to open, close, read, write, lock, unlock, etc. files as well as retrieve or set file characteristics. At block 904, process 900 fulfills the filesystem request. In one embodiment, process 900 performs a file operation (open, close, read, write, lock, unlock, list, etc.) and returns a return code indicating success/failure to the host and other relevant data for the request (data read, pointer, lock, etc.).

Figure 10:
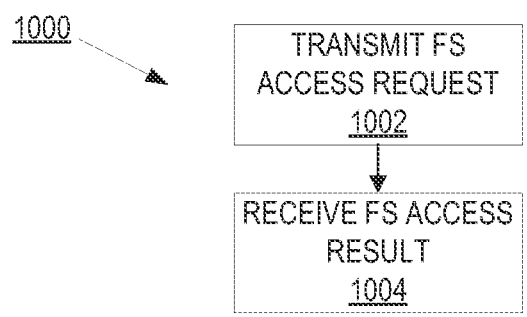
FIG. 10 is a flow diagram of one embodiment of a process to access the shared filesystem of the portable storage device.

FIG. 10 is a flow diagram of one embodiment of a process 1000 to access the shared filesystem of the portable storage device. In FIG. 10, at block 1002, process 1000 transmits a filesystem access request to the portable storage service. In one embodiment, the filesystem request is a SMB request to access the sharable filesystem. As is known in the art, a SMB request can be used to open, close, read, write, lock, unlock, etc. files as well as retrieve or set file characteristics. At block 1004, process 1000 receives the result of the filesystem access. In one embodiment, process 1000 receives a return code indicating success/failure of the operation and other relevant data for the request (data read, pointer, lock, etc.).

Figure 11:
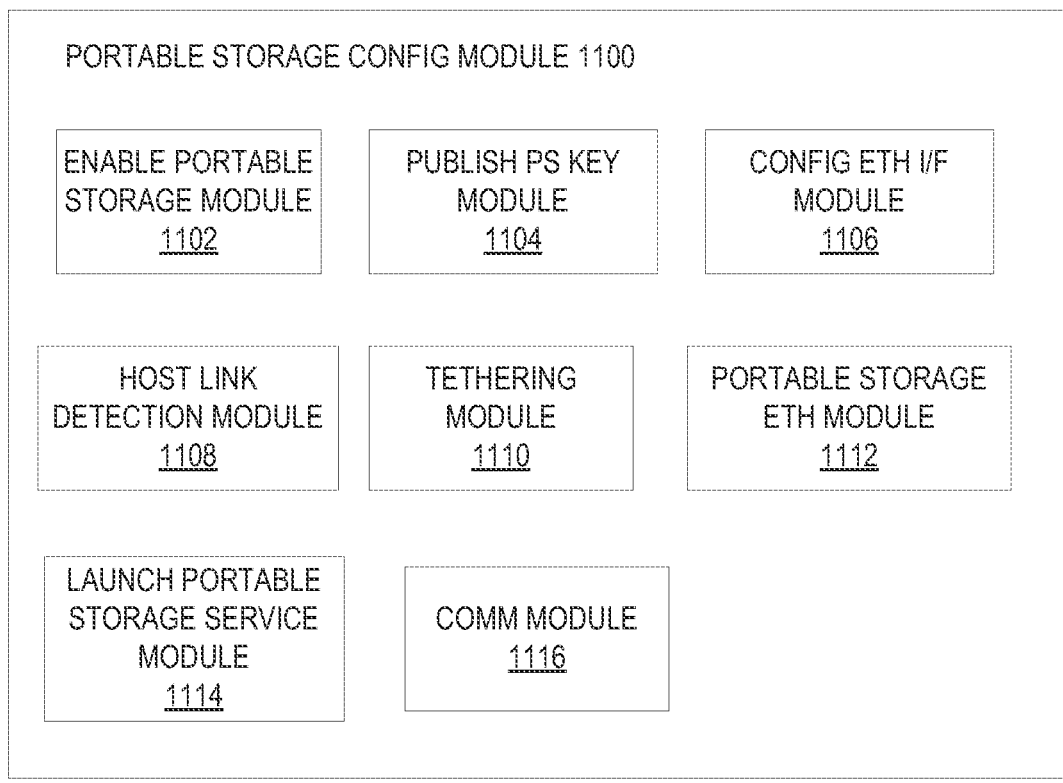
FIG. 11 is a block diagram of a portable storage configuration module that creates the dual Ethernet channel connection between the portable storage device and the host.

FIG. 11 is a block diagram of a portable storage configuration module 1000 that creates the dual Ethernet channel connection between the portable storage device and the host. In one embodiment, the portable storage configuration module 1000 is the configd 330 of FIG. 3 above. In FIG. 11, portable storage configuration module 1000 comprises an enable portable storage modules 1102, publish portable storage key 1104, configure Ethernet interface module 1106, host link detection module 1108, tethering module 1110, portable storage Ethernet module 1112, launch portable storage service module 1114, and communication module 1116. Enable portable storage module 1102 enables the portable storage as described in FIG. 6, block 602. Publish portable storage key 1104 publishes the portable storage key that enables portable storage as described in FIG. 6, block 604. Configure Ethernet interface module 1106 configures the portable storage Ethernet interface as described in FIG. 6, block 606. Host link detection module 1108 detects that the portable storage device is coupled to a host as described in FIG. 6, block 608. Tethering module 1110 configures the tethering Ethernet interface as described in FIG. 6, block 612. Portable storage Ethernet module 1112 configures the Ethernet interface for portable storage as described in FIG. 6, block 614. Launch portable storage service module 1114 launches the portable storage service as described in FIG. 6, block 616. Communication module 1116 communicates data as described in FIG. 6, block 620.

Figure 12:
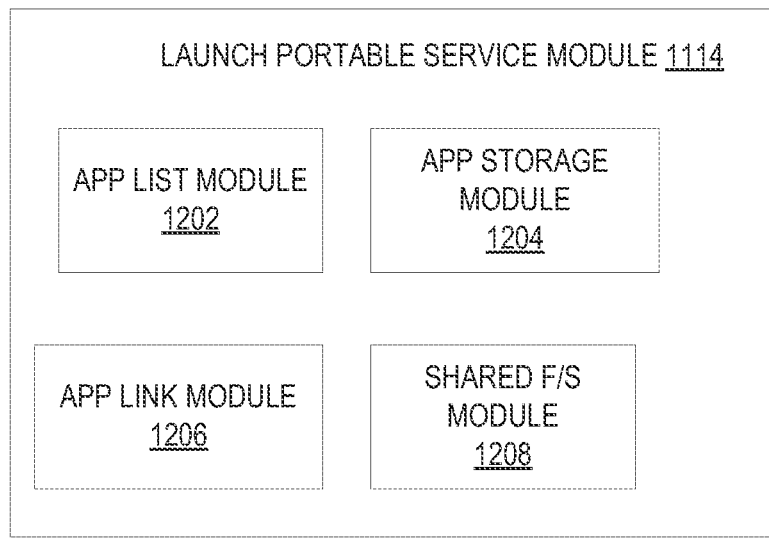
FIG. 12 is a block diagram of a launch portable service module that creates the shareable filesystem on the portable storage device.

FIG. 12 is a block diagram of launch portable storage module 1114 that launches the portable storage service on the portable storage device. In FIG. 12, launch portable storage module 1114 includes application list module 1202, application storage module 1204, application link module 1206, and shared filesystem 1208. Application list module 1202 retrieves the list of applications resident on the portable storage device as described in FIG. 7, block 702. Application storage module 1204 determines if the application private storage is shareable as described in FIG. 7, block 706. Application link module 1206 generates an application storage link as described in FIG. 7, block 708. Shared filesystem 1208 adds the application storage link to the shared filesystem as described in FIG. 7, block 710.

Figure 13:
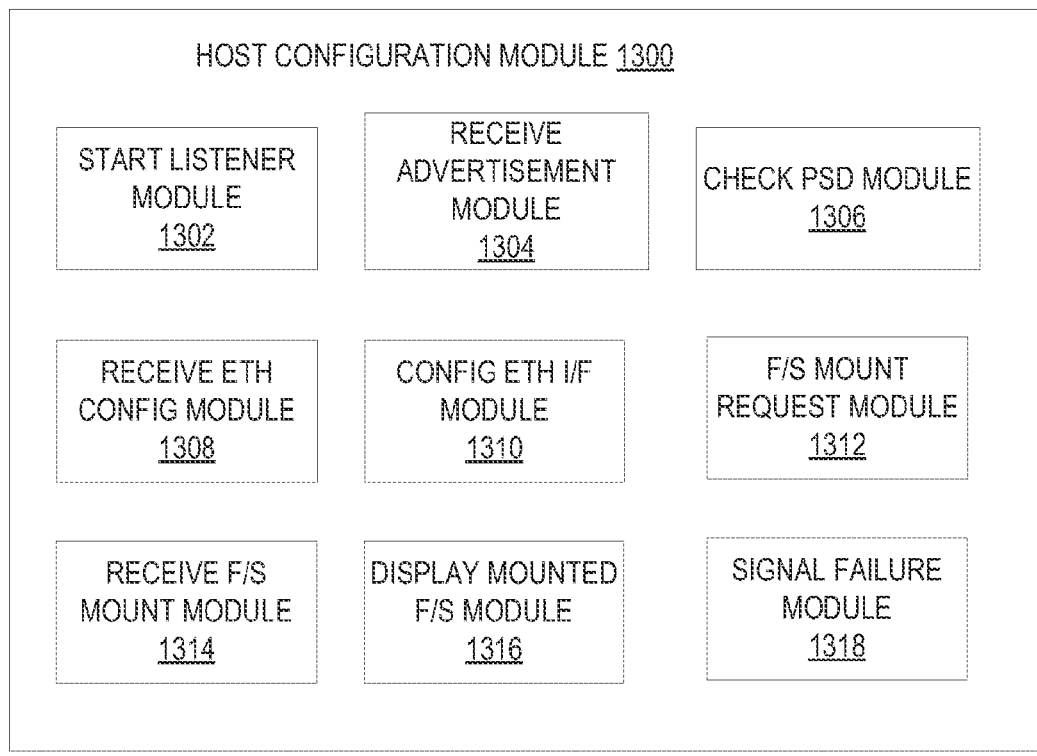
FIG. 13 is a block diagram of a host configuration module that configures the host to be able to access the shared filesystem on the portable storage device.

FIG. 13 is a block diagram of host configuration module 1300 that configures the host to be able to access the shared filesystem on the portable storage device. In one embodiment, the host configuration module is the host configuration component 342 as described in FIG. 3 above. In FIG. 13, host configuration module 1300 includes start listener module 1302, receive advertisement module 1304, check portable storage device module 1306, receive Ethernet configuration module 1308, configuration Ethernet interface module 1308, filesystem mount request module 1312, receive filesystem mount module 1314, display mounted filesystem module 1316, and signal failure module 1318. Start listener module 1302 starts the listener as described in FIG. 8, block 802. Receive advertisement module 1304 receive the portable storage service advertisement as described in FIG. 8, block 804. Check portable storage device module 1306 checks the portable storage device identifier as described in FIG. 8, block 806. Receive Ethernet configuration module 1308 receives the Ethernet configuration for the portable storage interface as described in FIG. 8, block 808. Configuration Ethernet interface module 1308 as described in FIG. 8, block 810. Filesystem mount request module 1312 transmits a filesystem mount request to the portable storage device as described in FIG. 8, block 812. Receive filesystem mount module 1314 receives notification that the requested filesystem was mounted as described in FIG. 8, block 814. Display mounted filesystem module 1316 displays the shared filesystem as described in FIG. 8, block 816. Signal failure module 1318 signals a failure as described in FIG. 8, block 818.

Figure 14A:
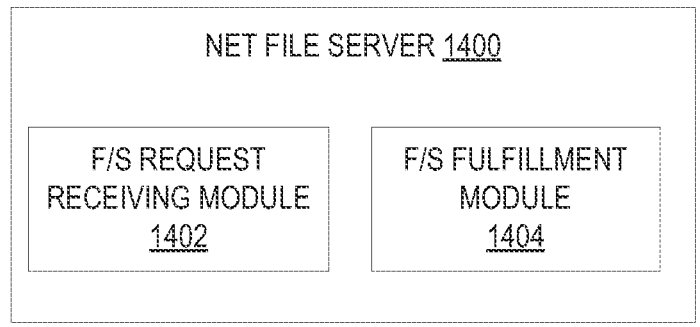
FIG. 14A is a block diagram of a file server module that handles accesses to the shared filesystem on the portable storage device.

FIG. 14A is a block diagram of network file server 1400 that handles accesses to the shared filesystem on the portable storage device. In one embodiment, network file server 1400 is the network file server that is part of the portable storage service as described in FIGS. 3-5 above. Network file server comprises filesystem request receiving module 1402 and filesystem fulfillment module 1404. Filesystem request receiving module 1402 receives filesystem requests as described in FIG. 9, block 902. Filesystem fulfillment module 1404 fulfills those requests as described in FIG. 9, block 904.

Figure 14B:
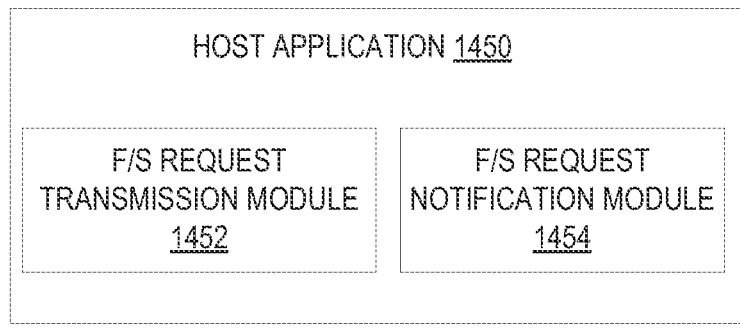
FIG. 14B is a block diagram of a file server module that makes accesses requests to the shared filesystem on the portable storage device.

FIG. 14B is a block diagram of host application 1450 that makes accesses requests to the shared filesystem on the portable storage device. In one embodiment, host application is a file browsing application or other host application as described in FIGS. 3-5 above. Host application 1450 includes filesystem request transmission module 1452 and filesystem request notification module 1454. Filesystem request transmission module 1452 transmits a request to access the shared filesystem of the portable storage device as described in FIG. 10, block 1002. Filesystem request notification module 1454 a receives a notification of a result to the filesystem access request as described in FIG. 10, block 1002.

Figure 15:
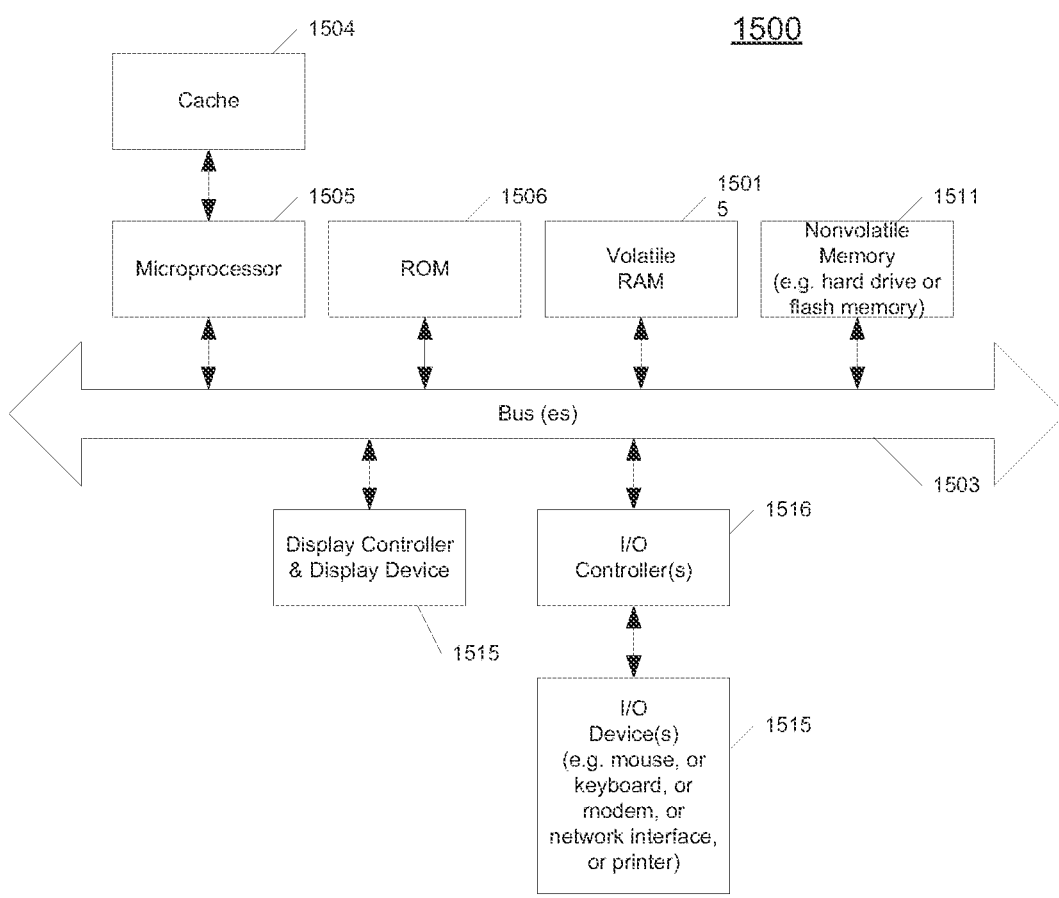
FIG. 15 illustrates one example of a typical computer system which may be used in conjunction with the embodiments described herein.

FIG. 15 shows one example of a data processing system 1500, which may be used with one embodiment of the present invention. For example, the system 1500 may be implemented including a host as shown in FIG. 1. Note that while FIG. 15 illustrates various components of a computer system, it is not intended to represent any particular architecture or manner of interconnecting the components as such details are not germane to the present invention. It will also be appreciated that network computers and other data processing systems or other consumer electronic devices which have fewer components or perhaps more components may also be used with the present invention.

As shown in FIG. 15, the computer system 1500, which is a form of a data processing system, includes a bus 1503 which is coupled to a microprocessor(s) 1505 and a ROM (Read Only Memory) 1507 and volatile RAM 1509 and a non-volatile memory 1511. The microprocessor 1505 may retrieve the instructions from the memories 1507, 1509, 1511 and execute the instructions to perform operations described above. The bus 1503 interconnects these various components together and also interconnects these components 1505, 1507, 1509, and 1511 to a display controller and display device 1513 and to peripheral devices such as input/output (I/O) devices which may be mice, keyboards, modems, network interfaces, printers and other devices which are well known in the art. Typically, the input/output devices 1515 are coupled to the system through input/output controllers 1517. The volatile RAM (Random Access Memory) 1509 is typically implemented as dynamic RAM (DRAM) which requires power continually in order to refresh or maintain the data in the memory.

The mass storage 1511 is typically a magnetic hard drive or a magnetic optical drive or an optical drive or a DVD RAM or a flash memory or other types of memory systems which maintain data (e.g. large amounts of data) even after power is removed from the system. Typically, the mass storage 1511 will also be a random access memory although this is not required. While FIG. 15 shows that the mass storage 1511 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1503 may include one or more buses connected to each other through various bridges, controllers and/or adapters as is well known in the art.

Figure 16:
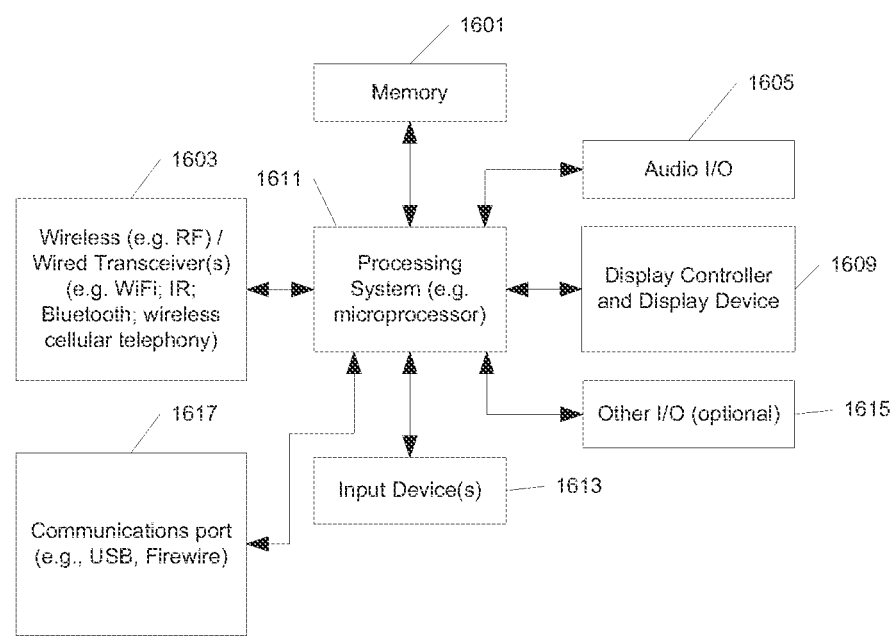
FIG. 16 shows an example of a data processing system which may be used with one embodiment of the present invention.

FIG. 16 shows an example of another data processing system 1600 which may be used with one embodiment of the present invention. For example, system 1600 may be implemented as a portable storage device as shown in FIG. 1. The data processing system 1600 shown in FIG. 16 includes a processing system 1611, which may be one or more microprocessors, or which may be a system on a chip integrated circuit, and the system also includes memory 1601 for storing data and programs for execution by the processing system. The system 1600 also includes an audio input/output subsystem 1605 which may include a microphone and a speaker for, for example, playing back music or providing telephone functionality through the speaker and microphone.

A display controller and display device 1607 provide a visual user interface for the user; this digital interface may include a graphical user interface which is similar to that shown on a Macintosh computer when running OS X operating system software. The system 1600 also includes one or more wireless transceivers 1603 to communicate with another data processing system, such as the system 1600 of FIG. 16. A wireless transceiver may be a WLAN transceiver, an infrared transceiver, a Bluetooth transceiver, and/or a wireless cellular telephony transceiver. It will be appreciated that additional components, not shown, may also be part of the system 1600 in certain embodiments, and in certain embodiments fewer components than shown in FIG. 16 may also be used in a data processing system. The system 1600 further includes one or more communications ports 1617 to communicate with another data processing system, such as the system 1500 of FIG. 15. The communications port may be a USB port, Firewire port, Bluetooth interface, etc.

The data processing system 1600 also includes one or more input devices 1613 which are provided to allow a user to provide input to the system. These input devices may be a keypad or a keyboard or a touch panel or a multi touch panel. The data processing system 1600 also includes an optional input/output device 1615 which may be a connector for a dock. It will be appreciated that one or more buses, not shown, may be used to interconnect the various components as is well known in the art. The data processing system shown in FIG. 16 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1600 may be a network computer or an embedded processing device within another device, or other types of data processing systems which have fewer components or perhaps more components than that shown in FIG. 16.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "configuring," "communicating," "advertising," "sharing," "detecting," "associating," "initiating," "assigning," "receiving," "retrieving," "enabling," "adding," 'coupling," "fulfilling," "transmitting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:
1. A method for enabling a host device to access data that is securely managed by a portable storage device, the method comprising, at the portable storage device:
   managing a plurality of applications resident on the portable storage device, wherein each application of the plurality of applications is associated with a respective private filesystem that stores data managed by the application that is inaccessible to the other applications of the plurality of applications;
receiving, from the host device, a request to access the respective private filesystem associated with at least one of the plurality of applications;
constructing a shared filesystem within the portable storage device;
for each application of the plurality of applications:
in response to determining, based on a key value associated with the application, that the application is configured to share the respective private filesystem with the host device, wherein the key value is stored in a configuration file associated with the application in conjunction with the application permitting the respective private filesystem to be shared:
updating a configuration of the shared filesystem to include a respective link that enables the host device to access the respective private filesystem; and
advertising the shared filesystem to the host device.

2. The method of claim 1, wherein the shared filesystem appears as a shared volume to the host device.

3. The method of claim 1, wherein advertising comprises transmitting an advertisement that includes an identifier of the portable storage device to the host device.

4. The method of claim 1, wherein a corresponding application resident on the host device has access to files in the shared filesystem.

5. The method of claim 1, further comprising:
assigning a private internet protocol (IP) address to an interface, wherein the shared filesystem is bound to the interface.

6. The method of claim 5, wherein the shared filesystem is accessible via the interface with the private IP address.

7. At least one non-transitory machine-readable medium configured to store instructions that, when executed by at least one processor included in portable storage device, cause the portable storage device to carry out steps that include:
managing a plurality of applications resident on the portable storage device, wherein each application of the plurality of applications is associated with a respective private filesystem that stores data managed by the application that is inaccessible to the other applications of the plurality of applications;
receiving, from a host device, a request to access the respective private filesystem associated with at least one of the plurality of applications;
constructing a shared filesystem within the portable storage device;
for each application of the plurality of applications:
in response to determining, based on a key value associated with the application, that the application is configured to share the respective private filesystem with the host device, wherein the key value is stored in a configuration file associated with the application in conjunction with the application permitting the respective private filesystem to be shared:
updating a configuration of the shared filesystem to include a respective link that enables the host device to access the respective private filesystem; and
advertising the shared filesystem to the host device.

8. The at least one non-transitory machine-readable medium of claim 7, wherein the shared filesystem appears as a shared volume to the host device.

9. The at least one non-transitory machine-readable medium of claim 7, wherein advertising comprises transmitting an advertisement that includes an identifier of the portable storage device to the host device.

10. The at least one non-transitory machine-readable medium of claim 7, wherein the steps further include:
coupling the portable storage device to the host device with a universal serial bus link.

11. The at least one non-transitory machine-readable medium of claim 7, wherein the steps further include:
assigning a private internet protocol (IP) address to an interface, wherein the shared filesystem is bound to the interface.

12. The at least one non-transitory machine-readable medium of claim 11, wherein the shared filesystem is accessible via the interface with the private IP address.

13. The at least one non-transitory machine-readable medium of claim 7, wherein a corresponding application resident on the host device has access to files in the shared filesystem.

14. A portable storage device, comprising:
at least one processor; and
at least one memory configured to store instructions that, when executed by the at least one processor, cause the portable storage device to:
manage a plurality of applications resident on the portable storage device, wherein each application of the plurality of applications is associated with a respective private filesystem that stores data managed by the application that is inaccessible to the other applications of the plurality of applications;
receive, from a host device, a request to access the respective private filesystem associated with at least one of the plurality of applications;
construct a shared filesystem within the portable storage device;
for each application of the plurality of applications:
in response to determining, based on a key value associated with the application, that the application is configured to share the respective private filesystem with the host device, wherein the key value is stored in a configuration file associated with the application in conjunction with the application permitting the respective private filesystem to be shared:
update a configuration of the shared filesystem to include a respective link that enables the host device to access the respective private filesystem; and
advertise the shared filesystem to the host device.

15. The portable storage device of claim 14, wherein the shared filesystem appears as a shared volume to the host device.

16. The portable storage device of claim 14, wherein advertising comprises transmitting an advertisement that includes an identifier of the portable storage device to the host device.

17. The portable storage device of claim 14, wherein a corresponding application resident on the host device has access to files in the shared filesystem.

18. The portable storage device of claim 14, wherein the at least one processor further causes the portable storage device to:
couple the portable storage device to the host device with a universal serial bus link.

19. The portable storage device of claim 14, wherein the at least one processor further causes the portable storage device to:
   assign a private internet protocol (IP) address to an interface, wherein the shared filesystem is bound to the interface.

20. The portable storage device of claim 19, wherein the shared filesystem is accessible via the interface with the private IP address.

* * * * *